Sept. 2, 1969  C. G. SCHREIB  3,464,685
PIPE CUTTING MACHINE

Filed Jan. 15, 1968  6 Sheets-Sheet 1

INVENTOR.
CARL G. SCHREIB,
BY Kimmel, Crowell & Weaver
ATTORNEYS.

Sept. 2, 1969   C. G. SCHREIB   3,464,685
PIPE CUTTING MACHINE
Filed Jan. 15, 1968   6 Sheets-Sheet 3

INVENTOR.
CARL G. SCHREIB,
BY Kimmel, Crowell & Weaver.
ATTORNEYS.

INVENTOR.
CARL G. SCHREIB,
BY Kimmel, Crowell & Weaver

ATTORNEYS.

3,464,685
PIPE CUTTING MACHINE
Carl G. Schreib, High St., P.O. Box 174,
Mauricetown, N.J. 08329
Filed Jan. 15, 1968, Ser. No. 697,941
Int. Cl. B23k 5/08, 7/04, 37/02
U.S. Cl. 266—23           8 Claims

ABSTRACT OF THE DISCLOSURE

A pipe cutting machine which includes a rollably mounted carriage and a rollable drive assembly connected to the carriage for rotating the carriage about the pipe to be cut, a reciprocal slidable bar on the carriage with means for mounting a cutting or welding torch on one end and a cam follower on the other end, and a crown cam secured to the pipe for causing the bar and the torch to reciprocate as the carriage rotates about the pipe for cutting the end of the pipe in a desired configuration or for welding the pipe in such configuration is disclosed.

BACKGROUND OF THE INVENTION

Field of the invention

This invention relates to cutting torches and welders and more particularly to mechanisms for moving cutting torches and welding devices on a work piece such as a pipe which is to be cut or welded.

Description of the prior art

United States Patents 3,063,697 and 3,166,620 disclose pipe cutting apparatus generally of the type under consideration with respect to this invention. The present invention constitutes an improvement over the devices disclosed in these patents.

SUMMARY

Without intending to limit the scope of the invention, the apparatus disclosed herein constitutes three major components. First, there is a carriage which includes a reciprocably mounted bar including a mount at one end for a cutting torch or for a welding torch and a cam follower at the other end. Secondly, a drive assembly is secured to the carriage on the opposite side of the pipe to be cut for driving the assembly and the carriage around the pipe in a smooth continuous fashion. Thirdly, there is provided a crown cam secured to the pipe adjacent the carriage against which the cam follower on the end of the slidable rod rides. As the carriage moves about the pipe being propelled by the drive assembly the cam follower causes the torch to move linearly of the pipe. By this means, it is possible to cut any desired curve on the end of the pipe according to the shape of the crown cam. This type of cutting and welding device is particularly important with respect to the forming of curves for joining one pipe into the side of another, whether the pipes be of equal or different sizes. The present invention also contemplates a novel weld joint and a process for forming the same. It is, accordingly, an object of this invention to provide an improved pipe cutting and welding apparatus, an improved welded pipe joint and a process for providing the improved welded pipe joint.

A more specific object of the invention is the provision of a process for forming a novel pipe joint by means of particular cutting, mating and welding steps.

Yet another specific object of the invention is the provision of a novel pipe joint.

Another and highly important specific object of the invention is the provision of a novel pipe cutting machine.

An additional and yet more specific object of the invention is the provision of a novel pipe cutting machine which includes an improved crown cam construction and an improved cam follower construction.

An additional specific object is the provisoin of a novel carriage construction including improved means for connecting a torch to the end of a reciprocal bar slidably supported in the carriage.

Yet another specific object of the invention is the provision of a novel drive mechanism for a cutting carriage of the type under consideration.

A further and specific object of the invention is the provision of an improved means for connecting a drive mechanism to a welding and cutting carriage.

A further and important object of the invention is to provide an improved combination of a carriage, a drive mechanism, and a cam mechanism.

Yet an additional object is the provision of an improved clamping mechanism for securing a torch to a carriage.

Yet an additional object of the invention is the provision of a novel reciprocal bar and a novel means for mounting the bar in the carriage for providing smoother operation.

The specific disclosure of the drawings taken together and individually constitute an important object of the invention and other objects will become apparent from the specification and from the drawings to which reference is now made.

DESCRIPTION OF THE PREFERRED EMBODIMENTS

Figure 1:
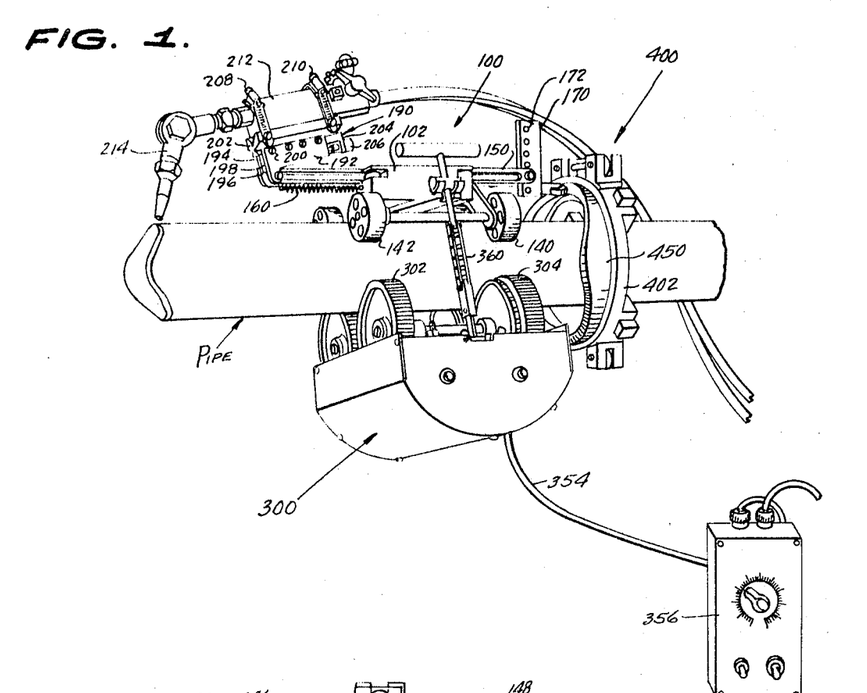
FIGURE 1 is a side perspective view of the overall assembly and the combination of the present invention.

Reference is now made to the drawings in particular wherein the reference numerals refer to identical parts throughout the several views of the invention. Reference is made first to FIGURE 1 which shows the over-all combination of the invention.

The invention comprises three major components. First, there is a carriage 100 which is provided with four wheels, two of which are shown at 140 and 142 for supporting the carriage rollably on the pipe to be cut. Secondly, there is the drive mechanism 300 which, like the carriage, includes four wheels, three of which are shown at 302, 304 and 306, for rollably supporting the drive mechanism on the pipe to be cut. The drive mechanism 300 is secured by a pair of chains, one of which is shown at 360, and a chain linking mechanism which will be described. Supported on the carriage, for reciprocal movement relative thereto, is a rod 150 to which is secured a cam follower mechanism shown generally at 170. The rod is biased in the direction of the cam follower by spring 160 and carries a torch clamping assembly shown at 190 on the other end. A torch 112 is secured by the mounting mechanism 190. A cam mechanism 400 which includes crown cam portions, one of which is shown at 450, extending toward the carriage constitutes the third major component of the invention.

The operation of the invention, briefly, may be described as follows. The carriage is rotatably driven on the outer periphery of the pipe by the drive assembly. Because of the precision construction of the carriage and the drive assembly, the carriage will traverse a substantially perfect circle about the periphery of the pipe. As the carriage traverses the circumference of the pipe, the cam follower 170 causes the reciprocal rod 150 to move outwardly and inwardly with respect to the carriage. As this occurs, the torch moves inwardly and outwardly and cuts the pipe off according to the shape of the cam. Similarly, if a welding torch is placed on the carriage, a weld bead of any desired curvature and configuration, according to the configuration of the cam, may be formed.

Figures 2, 5:
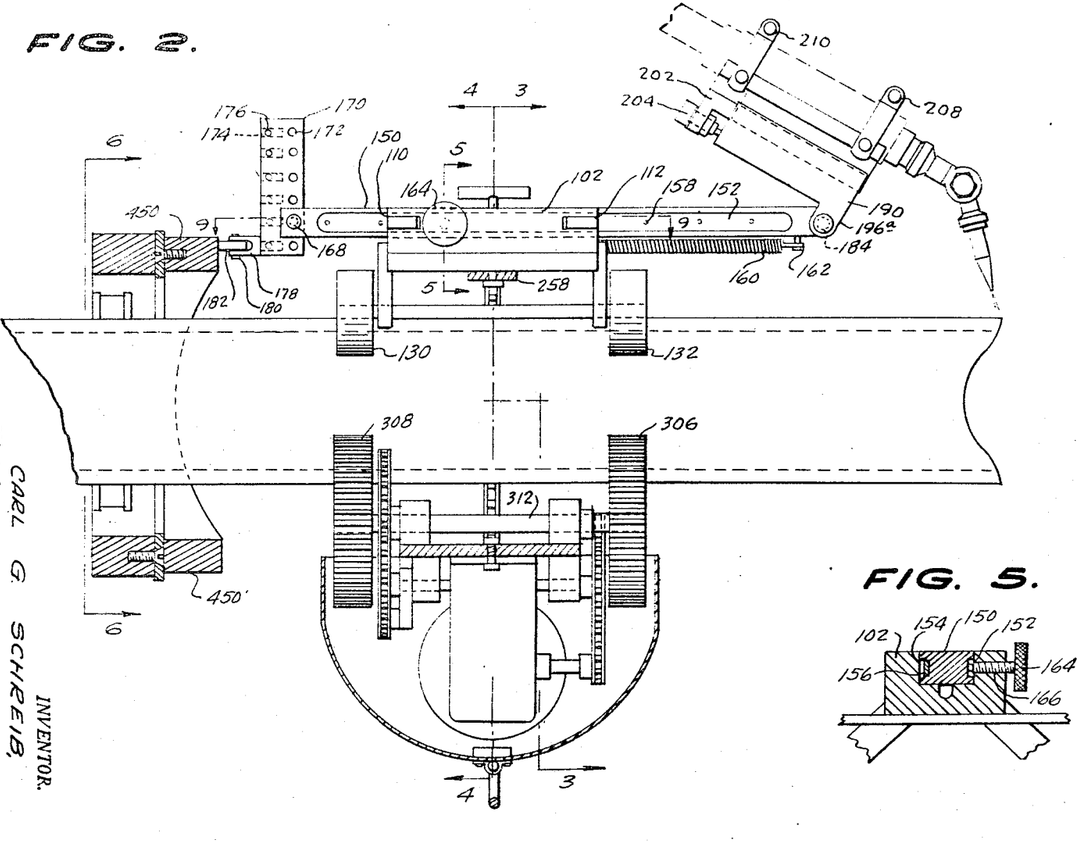
FIGURE 2 is a side view of the invention of FIGURE 1 taken from the opposite side, as shown in FIGURE 1, and shown partially in cross-section.
FIGURE 5 is an end cross-sectional view of the reciprocal bar of this invention and its mounting in the carriage taken substantially along lines 5—5 of FIGURE 2 in the direction of the arrows.
Figure 3:
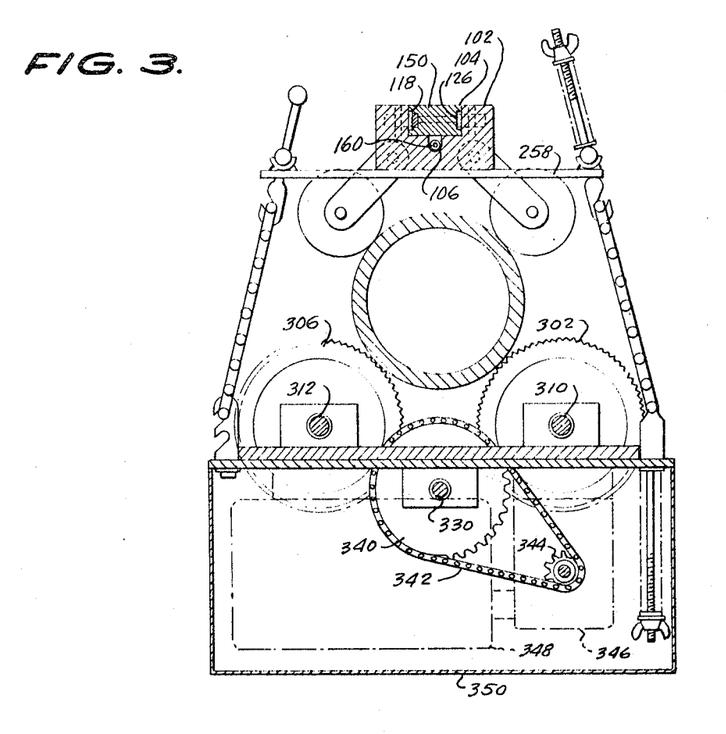
FIGURE 3 is an end view of the invention of FIGURE 1 shown partially in cross-section taken substantially along lines 3—3 in the direction of the arrows as shown in FIGURE 2.
Figure 4:
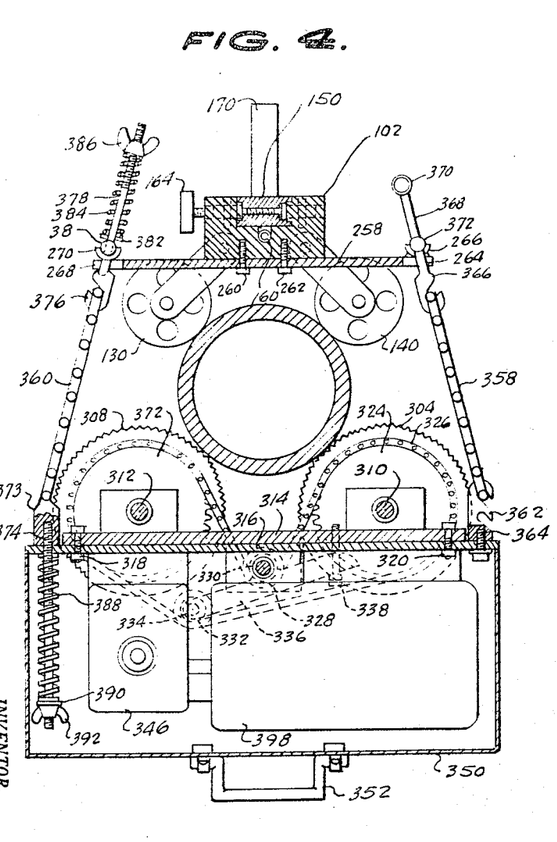
FIGURE 4 is an end view looking in the other direction, with respect to the view of FIGURE 3, shown partially in cross-section taken substantially along lines 4—4 in the direction of the arrows as shown in FIGURE 2.

Referring now to the construction in detail as shown in FIGURES 1, 2, 3, 4, 5 and 9, it will be seen that the carriage assembly 100 includes a main carriage body block 102. A vertical cross-section of this body block is shown in FIGURES 3, 4 and 5 and particular reference is made to FIGURE 3 for the configuration thereof. The body block is a generally regular rectangular body which includes a groove extending longitudinally of the block indicated generally at 104 in FIGURE 3 and which includes a further groove in the bottom thereof shown generally at 106 in FIGURE 3.

Figure 9:
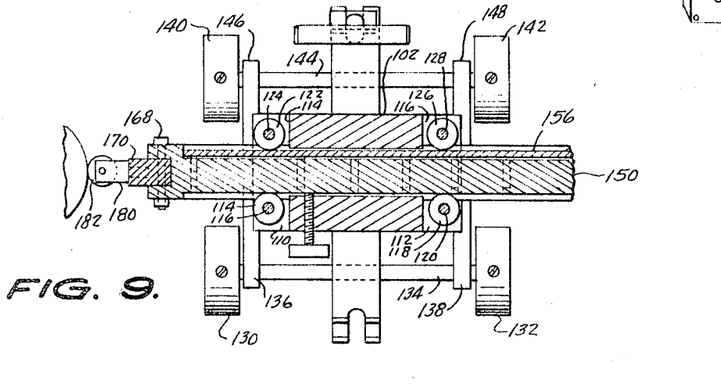
FIGURE 9 is a top plan view in partial cross-section of the carriage of FIGURE 2 taken substantially along lines 9—9, looking downwardly, in the direction of the arrows as shown in FIGURE 2.

Looking downwardly on the block with a top portion removed, as shown in the cross-sectional view of FIGURE 9, there are slots extending inwardly from the sides at each corner of the block as shown at 110, 112, 114 and 116. A plurality of wheels, 114 mounted by a pin 116 in the slot 110, 118 mounted by a pin 120 in the slot 112, 122 mounted by a pin 144 in the slot 114, and 126 mounted by a pin 128 in the slot 116, extend inwardly into the vertically formed slot 104, as shown in FIGURE 3. These wheels engage the reciprocal rod 150 as will be described in greater detail hereinafter.

As best illustrated in FIGURE 9, a plurality of wheels 130, and 132 mounted on an axle 134 which is, in turn, supported by a downwardly and outwardly extending pair of legs 136 and 138 and wheels 140 and 142 supported by an axle 144 by a second pair of oppositely outwardly and downwardly extending legs 146 and 148 support the carriage rollably on the pipe which is to be cut, as best illustrated in FIGURE 1.

As shown in FIGURES 5 and 9, an elongate rod-like member 150 which is generally rectangular in configuration and is provided with a groove 152 on one side and a double groove 154 on the other side is mounted for reciprocal movement in the carriage block 102. The double groove 154 includes an outer groove adapted to receive the sides of the wheels 114, 118, 122 and 126. An inner groove portion is adapted to receive an elongate resilient strap 156 which may be held in place by a plurality of Allen screws or the like shown at 158. It will thus be seen that the sides of the composite reciprocal bar 150 which are adapted for being engaged by the wheels are adjustable relative to each other to provide for smooth and even reciprocal movement. The importance of this will be discussed in greater detail hereinafter but, briefly, it is pointed out that if a clean smooth weld is to be made, it is absolutely vital that the carriage move uniformly and smoothly about the pipe and that the reciprocal bar move uniformly and smoothly in the carriage. It is in this respect that the present invention constitutes one improvement and advance over the inventions of the prior art.

As best shown in FIGURES 1 and 2, a spring 160 is mounted by a pin or the like 162 to the reciprocal bar 150 and is similarly mounted to the carriage by means not shown for biasing the bar with respect to the carriage.

As best shown in FIGURE 5, the bar 150 may be fixed with respect to the carriage by means of a knurled head bolt 164 which is threadably received in an aperture 166 in the side of the main body block 102.

FIGURE 2 shows the mounting, in a vertically disposed slot in one end of the reciprocal rod 150 by means of a bolt 168, of a cam follower block 170. The cam follower block 170 is generally rectangular in configuration for being snugly received in the slot in the one end of the reciprocal bar 150. A plurality of apertures 172 extend therethrough for selectively receiving the bolt 168 therethrough. This permits vertical adjustment of the cam follower assembly for reasons which will be discussed in greater detail hereinafter but, briefly, the purpose of this adjustment is to permit the use of a plurality of cams of different sizes according to the size of the pipes involved. At substantially right angles in the block 170 there are provided a similar plurality of blind apertures 174, each of which is intersected by a threaded aperture 176 for a set screw. A wheel mount 178 includes an extension for being snugly received in the blind aperture 174 and may selectively be mounted in any of these apertures and rotatably supports, by means of a pin 180, a cam follower wheel 182. It will be seen that the spring 160 biases the reciprocal block 150 toward the one end wherein the cam follower block is received such that the cam follower 182 will follow the cam portion 450. As best shown in FIGURE 2, the other end of the reciprocal rod 150 is provided with a transverse aperture 184. The torch mounting block assembly 190 which includes a pair of side blades 192 and 194, each of which includes a downwardly extending apertured ear of the type shown at 196, secured together on a central block 198 by means of a plurality of bolts 200. The apertured ears 196, shown in FIGURE 1 and 196a shown in FIGURE 2, are mounted by a bolt or other suitable means extending therethrough and through aperture 184 in the end of the reciprocal bar 150. This provides a pivotal interconnection between the reciprocal bar 150 and the mounting block assembly 190 and the apertures and the mounting bolt or pin or the like are so configured and constructed as to normally retain the mounting block 190 in such configuration as it is placed. Slidably received in a slot in the upper part of the central block 198 is a V-shaped clamping block 202 which includes a downward extending ear 204 through which is threadably received a bolt 206 for positioning the slidable block 202 relative to the center block 198. A pair of clamps of conventional construction shown at 208 and 210 clamp the torch 212 to the V-block 202. The torch may be of the type which includes a pivotal nozzle shown at 214.

Figure 10:
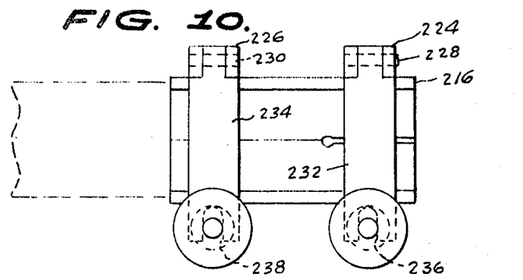
FIGURES 10, 11 and 12 are, respectively, top, and end side views of an improved embodiment of a clamp for a welding torch or a cutting torch of the type shown in FIGURE 1.
Figure 11:
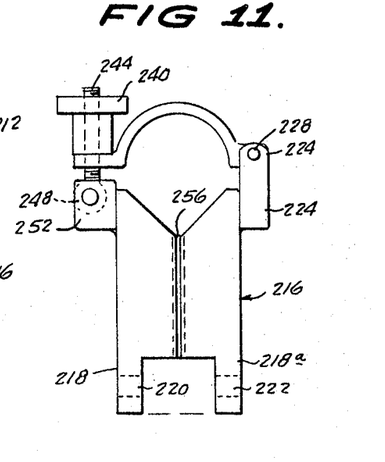
Figure 12:
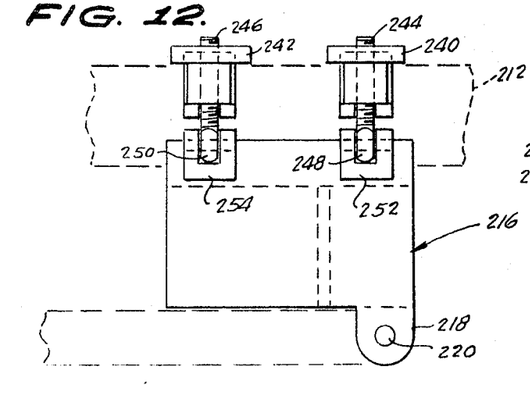

Reference is made now to FIGURES 10, 11 and 12 wherein a modified and simplified embodiment of the torch mounting mechanism is illustrated. This embodiment comprises a block 216 which includes a pair of ears 218 and 218a apertured as shown at 220 and 222 extending downwardly for being pivotally mounted on the end of the reciprocal rod 150.

The block 216 is roughly rectangular in shape with the aforementioned ears but includes a concave V configuration in the top. In addition, a pair of upwardly extending bosses 224 and 226 are provided with apertured ears for receiving pins 228 and 230 which mount arcuate cross straps 232 and 234 pivotally on the block. These straps include open slots 236 and 238 at the other ends thereof. The configuration of these straps is best shown in FIGURE 11. The free end of each of the straps is, respectively, held in place by knobs 240 and 242 which are threadably received on bolts 244 and 246 which includes eyes 248 and 250 which are pivotally mounted in apertured bosses 252 and 254 by a pin of the type previously described. It will be seen from the foregoing and with reference to the drawings that the cross-over straps are arcuately configured downwardly for clamping a torch in the V-shaped upper surface of the block. Desirably, a passageway 256, which may be threaded, is provided in the block and communicates with the V-shaped top therein. A threaded bolt or screw may be received in this aperture for bearing against the bottom of the torch, if so desired.

Extending transversely of the carriage, as best shown in FIGURES 3 and 4, to which FIGURE 4 is referred in particular, is a supporting cross-member 258 secured to the main carriage mounting block by means of bolts 260 and 262. One end of the cross member 258 is slotted inwardly from the end thereof and is provided with a pair of upwardly concave receiving members shown at 262. A similar construction including a slot 268 and upwardly concave receiving members 270 is provided at the other end.

Figure 18:
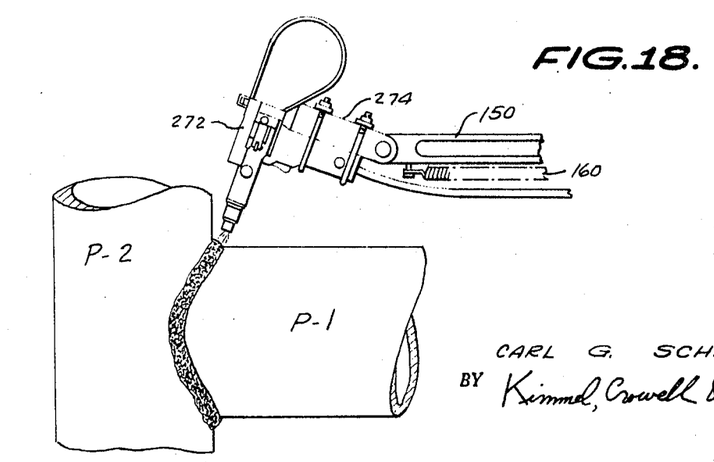
FIGURE 18 illustrates one step in the process of joining two pipe portions, the respective pipe portions in the embodiment of FIGURE 18 being shown joined at right angles relative to each other.

As shown in FIGURE 18, a welding torch for continuously feeding wire to form a bead, shown at 272, may be secured by means of a pivotal block 274 to the end of the reciprocal rod 150 in order to use the device for welding rather than cutting.

Reference is made now to FIGURES 1, 2, 3, and 4 for a description of the driving assembly 300. The driving assembly 300 includes drive wheels, which are preferably knurled or formed with sharp lugs thereon, shown at 302, 304 and 306 in FIGURE 1, wheel 308 being shown in FIGURE 2. Wheels 302 and 304 are mounted on an axle or shaft 310 while wheels 306 and 308 are mounted on a similar axle 312.

As best shown in FIGURE 4, these axles are mounted by conventional journal blocks which may include Oilite bearings therein. These blocks are mounted on a main drive wheel carriage frame 314 which is in turn secured to a drive assembly plate 316 by a pair of bolts 318 and 320. The wheels are turned by means of sprockets 322 and 324 received respectively upon the shafts 312 and 310 which are driven by a chain 326. The chain 326 extends around a driven sprocket 328 which is mounted on a driven shaft 330 and an idler sprocket 332 which is mounted on a shaft 334 which is in turn carried on a chain adjusting member 336 which is pivotally mounted on the shaft 330 by means of an Oilite bearing and which is adjusted by means of a bolt 338 which is threadably received in the members 314 and 316. It will be apparent that by adjusting the bolt inwardly the tension on the chain can be increased. Thus, as the chain wears in during use, the tension may be increased to prevent for undesirable lag or looseness. The importance of this will be apparent to those skilled in the art since if the device is to be driven smoothly, it is important that there be no slack in the drive mechanism.

As best shown in FIGURE 3, the other end of the shaft 330 is mounted in the conventional manner and carries thereon a sprocket 340 which is driven by means of a chain 342 from a sprocket 344 on a speed reduction mechanism 346 which is in turn driven by a controllable speed motor 348.

Referring again to FIGURE 4, along with FIGURES 1, 2 and 3, it will be seen that the entire drive assembly, except for the drive wheels, is enclosed in a housing 350 which may include a handle 352 of any desired configuration. The speed of the motor is controlled by a selective application of power through line 354 from a motor controller 356. The motor and the controller are of conventional commercial design and are available from electrical equipment suppliers.

Figure 13:
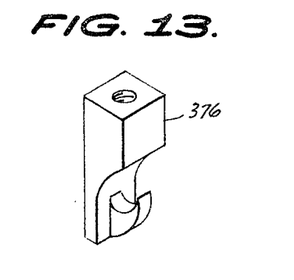
FIGURE 13 is a detailed perspective view of a chain anchor block of the type shown in FIGURE 4.

The drive assembly, as best shown in FIGURE 2, is secured to the carriage by means of a pair of chains 358 and 360. The chain 358 is engaged in a slot in a chain catch 362 which is mounted by a bolt 364 to the drive assembly and is, likewise, engaged in a chain receiving slot in a block 366 which may be formed integrally with a shaft 368, handle 370 and an engaging cross member 372 which is received in the upwardly arcuate receiving members 266. On the other side, the chain 360 is pivotally secured to a block 373 which is in turn secured to the drive assembly by a bolt 374. At the other end, the chain 360 is secured to a chain engaging catch 376, which is shown in greater detail in FIGURE 13. A bolt 378 is received in the block 360 and extends upwardly through the slot in the end of the cross member 258. A cross member 380 is slidably received on the bolt 378 as is a retaining washer 382 and a spring 384. The tension on the spring is adjustable by means of a wing nut 386. At the other end of the chain 360, it will be noted that there is provided a spring 388 slidably received about the bolt 374 along with a keeper washer 390. The tension on the lower end of the chain may be adjusted by a wing nut 392 which is threadably received on the bottom end of the bolt 374. Thus, it will be seen that adjustable tensioning means are provided for the chain 360 and both chains 358 and 360 may be incrementally adjusted by selecting the desired link to be engaged. Thus, the carriage and drive mechanism may be adjusted for substantially any size of pipe.

Figure 6:
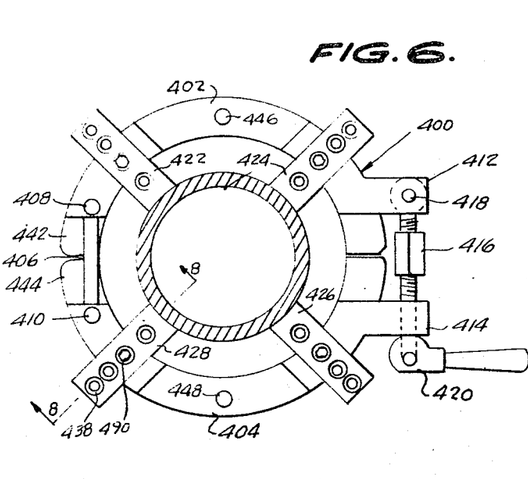
FIGURE 6 is an end view of the cam assembly of the present invention taken substantially along lines 6—6 in the direction of the arrows as shown in FIGURE 2.
Figure 7:
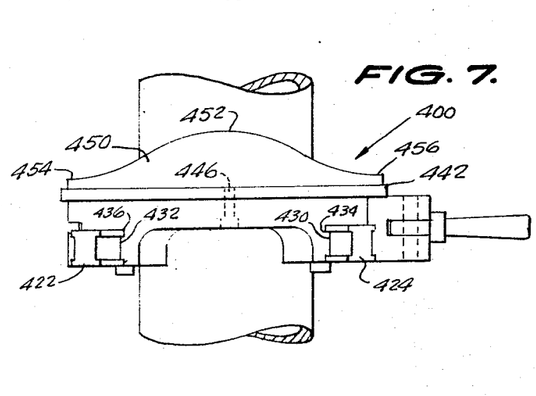
FIGURE 7 is a plan view of the cam assembly of FIGURE 6 taken from the top, as shown in FIGURE 6.
Figure 8:
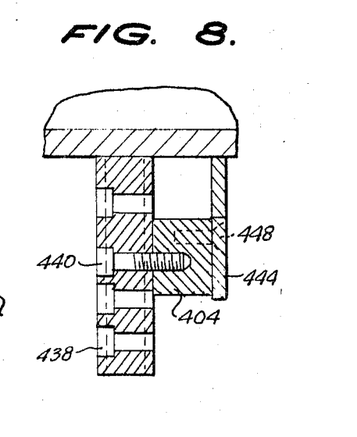
FIGURE 8 is a side view shown in partial cross-section of means for engaging the pipe of the invention of FIGURE 6 taken substantially along line 8—8 in the direction of the arrows as shown in FIGURE 6.

Reference is made now to FIGURES 6, 7 and 8. The cam assembly 400 includes a pair of upper and lower arcuate cam support members 402 and 404 secured together b ymeans of pin 406 which is pivotally mounted at 408 and 410 in the respective cam mounting members 402 and 404. On the other side, extensions 412 and 414 are provided on the respective mounting members and are selectively secured together by an adjustable tie rod assembly 416 which includes right and left thread portions received in end-to-end juxtaposition in an elongate hollow threaded nut, the entire tie bolt assembly 416 being pivotally mounted at 418 in the extension 412 and extending through a slot in the extension 414. The other end, which extends through the said slot, is pivotally connected to an eccentric cam block 420 with a suitable operator thereon. It will be apparent to a skilled mechanic that this permits adjustment of the mounting means and the quick clamping and unclamping of the mounting means on a pipe according to known principles.

Preferably, four inwardly extending engaging rods 422, 424, 426 and 428 are slidably received in complementarily formed slots 430 and 432 which include slot extensions 434 and 436, for example, for permitting longitudinal movement of the engaging members 422, 424, 426 and 428 but preventing rotary or angular or lateral motion thereof. Each of these engaging rods includes a plurality of apertures of the type shown at 438 as being exemplary and may receive, selectively, a conventional machine bolt 440 therein. The apertures are countersunk, as best illustrated in FIGURE 8, for receiving the machine bolts. These machine bolts extend, respectively, into the arcuate mounting members 402 and 404 for fixing the position of the engaging bars relative thereto.

Portions of the arcuate mounting members 402 and 404 may be incut to reduce the weight thereof.

A pair of arcuate cam mounting plates 442 and 444 are secured, respectively, by bolts 446 and 448 to the members 402 and 404. Additional bolts would normally be utilized but are not shown for purposes of clarity.

A very important facet of the construction is the provision of a pair of semicircular crown cam elements of the type shown at 450 which include an apex portion 452 and a valley portion 454 and 456 at each end thereof. Two such crown cam portions are secured together to form a circular crown cam surface. The crown cam surface is in the form of a circularly disposed sinusoidal wave. The amplitude and period of the sinusoidal wave will be varied according to the size, the diameter, of the pipe to which the pipe portion being cut will be secured. Thus, a given diameter pipe portion, say four inches, may be cut with several sinusoidal configurations on the ends thereof depending on whether it is to be joined to another four inch pipe, a five inch pipe, and eight inch pipe, etc. A cam may be provided for each size of pipe according to known mathematical functions.

Figure 15:
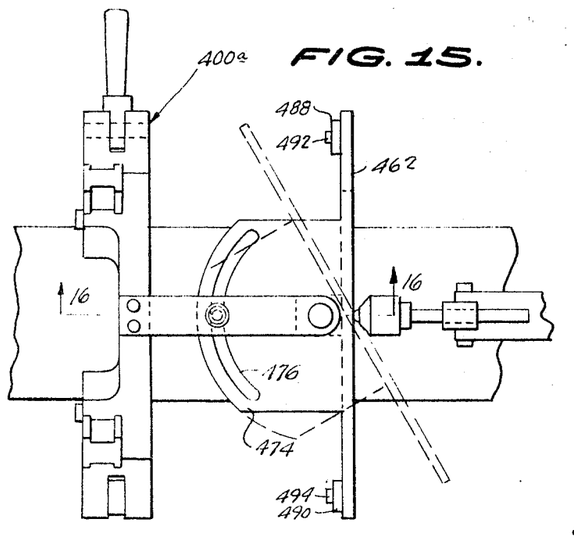
FIGURE 15 is an alternative embodiment of the camming means of this invention showing means for cutting a pipe at a desired straight angle.
Figure 16:
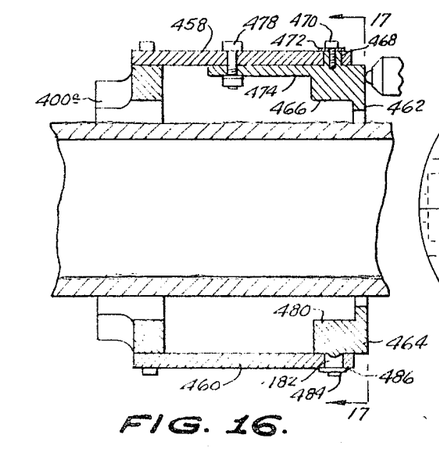
FIGURE 16 is a cross-sectional view of the invention of FIGURE 15 taken substantially along lines 16—16 in the direction of the arrows as shown in FIGURE 15.
Figure 17:
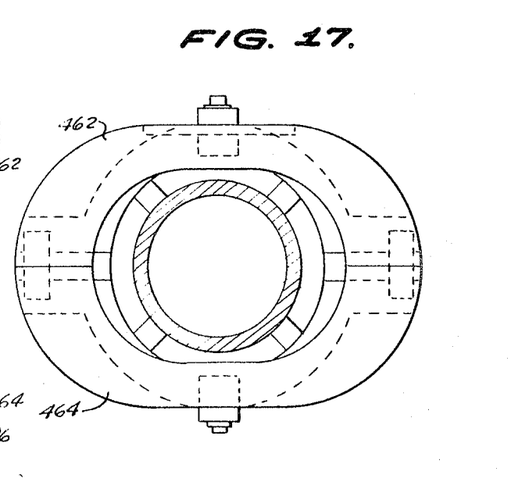
FIGURE 17 is a front view of the embodiment of FIGURE 15.

Reference is made now to FIGURES 15, 16 and 17 for an alternative embodiment of the cam assembly wherein means are provided for cutting a straight angle on the end of the pipe. In this embodiment, a cam mounting assembly 400a of the type previously disclosed is provided with a pair of extensions 458 and 460 mounted by any conventional means such as machine bolts. Each of the extensions 458 and 460 include apertures in alignment near the ends thereof and the extension 458 includes an intermediate aperture.

A pair of planar cam surface members 462 and 464 which together form a cam surface which is arcuate at each end and is generally straight in the center are mounted by means to be described for being pivoted between the extension 458 and 460. A rearwardly extending boss 466 is mounted on the cam plate 462 and includes an upwardly extending annular member 468 which is received through an aperture in the extension 458 and is held in place by means of a bolt 470 and a washer 472 mounting the cam member 462 to the extension 458. A further rearward extension 474 which is in the form of a plate having an arcuate stud 476 therein extends further rearwardly from the boss 466. The angular position of the cam may be fixed by means of a bolt 478 extending through an aperture in the extension 458 and the slot 476.

On the bottom, a boss 480 is provided with an annular boss extension 482 which is received through the aligned aperture in the bottom extension 460 and is held in place by means of a bolt 484 and a washer 486. Thus, it will be seen that the cam surface formed by the cam members 462 and 464 may be adjusted to any desired angle to permit a straight angular cut of the pipe. Elongate oval keeper members 488 and 490 may be secured by means of bolts or pins 492 and 494 to the cam members 462 and 464 at the junction thereof, if so desired. Any desired cam follower may be used with the cam surface formed by these cam members.

The welding and cutting torches may be of the type sold by Air Products and Chemicals, Incorporated, Allentown, Pa., or of any other conventional type. Descriptive literature on the several types of cutting and welding torches and equipment of the type which may conventionally be used with the invention described is published by Air Products and Chemicals, Incorporated and particular reference is made to those publications which became effective Jan. 15, 1966. These are merely exemplary, however, of the types of equipment which may be used.

The controllable motor may be of the type made by Boston Gear Company and marketed as Boston Ratiotrol along with Boston Reducer No. UF109. The controllable motors and gear reduction assemblies marketed by Boston Gear Company, Bodine Manufacturing Company and other commercial suppliers may be used according to the availability and preference of the manufacturer.

It has been found that it is impossible to provide the necessary clean smooth cut wherein the welding torch is moved about the pipe by hand. This is probably because the operator cannot move the torch at a uniform speed and, consequently, the pipe heats to different temperatures depending upon the speed at which the torch is being moved. To rectify this, it has been found that it is necessary to supply a drive assembly of the type disclosed herein. Further, by the construction disclosed herein it has been found that once the carriage and drive assembly have been placed on the pipe and permitted to rotate one or two times to orient themselves properly on the pipe, they will rotate in a substantially perfectly circular path about the pipe. This, obviously, permits the pipe to be cut off in a straight right angular cut. More importantly, however, this permits the crown cam surface to reciprocably move the torch to cut the sinusoidal end on the pipe as desired.

Quite unexpectedly, it has been found that there is considerably less waste with the present machine than with the machines in the prior art. This reduction in waste is accomplished not only without the reduction in quality of work but by actually increasing the quality of work in the sense that a stronger and more shock and bend resistant joint in pipes can be formed by the process to be described.

Figure 14:
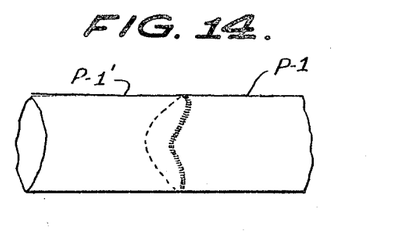
FIGURE 14 is a side perspective view of an improved weld joint for portions of a pipe.

This process comprises three basic steps, first, the end of a first pipe portion is cut according to a predetermined sinusoidal pattern utilizing the device previously described. Secondly, a second pipe portion is cut with an identical sinusoidal path. The two sinusoidal ends are placed adjacent each other in comating juxtaposition such that no gaps exist therebetween. The device of the invention just described is then placed on the pipes and the torch is appropriately positioned, along with the cam, and a weld bead is run around the pipe following the sinusoidal path of the two cuts. Since the weld bead does not lie in a single plane perpendicular to the pipe, the pipe can be bent without the entire force of the bend being exerted on the weld bead. The pipe can be stressed, vibrated, stretched and otherwise deformed without applying the external force to the entire weld bead but rather to a portion of the weld bead and a portion of the unitary pipe. This type of construction is particularly important in ships where the plumbing is constantly being distorted due to the roll and pitch of the ship. Thus, it will be seen that there is dual unexpected benefit flowing from the process. First, there is a reduction in waste because it is possible to utilize the pipes which have been cut for right angular joints without further modification and, secondly, the joints made by means of the process described, illustrated in FIGURE 18 with respect to a right angle joint and for producing a straight joint of the type shown in FIGURE 14 are considerably stronger and are much less susceptible to breakage upon repeated flexing as in a steam line or in a ship.

The apparatus of this invention has the advantage that it is comparatively light and easily portable and, thus, may be taken to the job. In a fabrication plant it is generally of considerable importance but it becomes of paramount importance where field operations are involved. Thus, it is possible to place the cutting and welding device of this invention on a pipe in an oil field, along a pipeline, or in any other remote area. This brings about the potentiality for results which are not possible with the stationary means and devices of the type known in the prior art.

Other advantages of the invention, as described and shown, will be apparent to those skilled in the art from inspection of the device and from the foregoing disclosure. While the disclosure makes reference to specific embodiments of the invention and to specific constructions of the invention and the drawings illustrate preferred embodiments and constructions, it will be understood that these are merely exemplary of the invention and are not intended in the limiting sense. Accordingly, it is contemplated that the invention shall be limited only by the scope of the following claims and the departures may be made from the actual disclosure without departing from the spirit of the invention.

I claim:

1. In a pipe cutting and welding machine, the combination which comprises:
   a carriage (100);
   means mounting the carriage for rotation in a circular path on a fixed pipe for rotation in a circular path about the circumference thereof (e.g., wheels (130, 132, 140) and (142) and supports);
   an elongate linear torch support rod (150);
   means mounting the support rod in the carriage for relative reciprocal movement (e.g., rollers (114, 118, 122) and (126));
   a torch;
   means for securing the torch to one end of the rod (190);
   a cam follower assembly on the other end of the rod (170);
   means biasing the rod in the direction of the cam follower assembly (160);
   a drive assembly (300), including drive wheels for engaging the pipe (wheels (302, 304, 306, 308));
   means for securing the drive assembly to the carriage on the opposite side of the pipe for being supported by the pipe for driving the carriage in said circular path (e.g., chains (358) and 360));
   a cam mounting assembly for being secured to the pipe (400);
   a crown cam which includes at least two arcuate portions (450, 450'), said cam defining a circular path transversely of the pipe and a sinusoidal path linearly of the pipe; and
   means securing the cam to the cam mounting assembly (442, 444).

2. The invention of claim 1 wherein the cam follower assembly comprises:
   a generally rectangular block having a plurality of apertures therethrough adjacent one edge linearly spaced parallel to the longitudinal axis;
   means on the end of the support rod defining a clevis like portion having apertures for alignment with a selected aperture in the block, said clevis like portion being so constructed relative to the block that the block is snugly received therein for extending a selected distance upwardly or downwardly from the end of the support rod;
   a pin securing the block in the clevis like portion;
   said block including means for securing a wheel support assembly for extension opposite the support rod; and
   a wheel support assembly including a rotatable cam follower wheel secured to said block for moving along the crown cam when the carriage rotates and being held in contact with said crown cam by said biasing means.

3. The invention of claim 1 wherein the torch securing means comprises:
   an elongate block having an inwardly concave V-shaped top configuration, a front end and a rear end;
   a pair of downwardly extending ears on the front end, said ears including apertures therethrough;
   a pin extending through said apertures and through an aligned aperture in the support rod such that the block normally rests on the top of the rod;
   at least one arcuate strap member made of a rigid material;
   means pivotally mounting the strap member on one side of the elongate block; and
   means including tension adjustment means for selectively securing the other end of the strap across the top of the block to the other side of the block.

4. The invention of claim 1 wherein the support rod comprises:
   an elongate generally rectangular cross sectional rod having a groove in one side, a similar groove in the other side and a second groove in the groove in the other side and including a plurality of transversely disposed threaded apertures therein;
   an elongate flat generally planar strap received in the second groove; and
   screw means for adjusting the position of the strap in the second groove, said screw means being received in the threaded apertures in the rod.

5. The invention of claim 1 wherein the means mounting the support rod for reciprocal movement comprises:
   a main carriage body block which has an elongate slot in the top surface thereof for receiving the support rod and a slot extending from the elongate slot for receiving the bias means and further includes a slot extending inwardly on each side of the elongate slot at each end of the block; and
   a rotatably mounted wheel in each of the last named slots, said wheels extending into the elongate slot for rollably engaging the support rod, said support rod including slots in the respective sides thereof for receiving said wheels.

6. The invention of claim 1 wherein the cam mounting assembly comprises:
   a pair of semicircular mounting members;
   means pivotally mounting one side of the semicircular members together;
   means for selectively securing the other side of said semicircular members together about the pipe to be worked on, said securing means including means for adjusting the distance between said semicircular members;
   a pair of radially disposed engaging members slidably received in complementary slots in each semicircular member for contacting the pipe and coaxially positioning the semicircular members about said pipe;
   means for securing the engaging members in the last named slots; and
   means for mounting the crown cams on the semicircular members in coaxial alignment with the pipe.

7. The invention of claim 6 wherein the means for mounting the crown cams on the semicircular members comprises:
   a pair of planar, arcuately shaped plates secured to the semicircular members for forming a circularly planar mounting surface; and
   means for mounting selected sizes of crown cam members perpendicular to the planar mounting surface.

8. A pipe welding and cutting machine, which, in combination, comprises:
   a carriage which includes:
      a main carriage body block having a major axis extending longitudinally thereof, a minor axis and a transverse axis of intermediate length, said block having formed in the upper surface thereof a cross sectionally rectangular slot extending along the major axis and a second slot extending toward the bottom surface of the block from the rectangular slot and four slots located respectively at the ends of the block and extending inwardly therefrom in communication with the rectangular slot, wheels mounted for rotation in each of the end slots and for extending partially into the rectangular slot therefrom, a generally rectangularly cross sectionally configured elongate support rod slidably received in the rectangular slot, said rod having side slots for receiving the aforenamed wheels and including a separable elongate strap and means adjustably securing the strap in one of the side slots for adjusting the frictional engagement of the wheels on the rod, said rod having a transverse passage proximate one end and a clevis portion at the other end, a torch mounting block which includes a pair of downwardly extending apertured ears at one end secured at the one end of the support rod by a pin which extends through the apertures in the ears and the rod, said mounting block having a concave V top surface supporting a torch and including a pair of pivotally mounted straps on the top for securing the torch in the V top surface a cam follower block having a length, a thickness and a width, said block having a plurality of holes through the thickness thereof aligned along the length of the block and a plurality of blind apertures perpendicular to the holes aligned in an edge along the length thereof, a wheel mount which includes a shaft for being received in a selected blind aperture mounting a rotatable cam follower wheel to the rod, said cam follower block being received in the clevis portion of the rod and including pin means for securing said cam follower block in said clevis portion, said pin means extending through a selected hole in said cam follower block, and a set of wheels secured to the main carriage body block for rollably supporting the carriage on the pipe;

a drive mechanism which includes drive wheels for engaging the pipe and means for securing the drive mechanism to the carriage on the opposite side of the pipe for revolving the carriage about the pipe; and a cam assembly which includes:
  a pair of semicircular mounting members, each having a radially disposed I-shaped slot therein,
  means pivotally connecting one end of the semicircular members together,
  means for selectively connecting the other end of the semicircular members together,
  a cross sectionally I-shaped engaging bar slidably received in each I-shaped slot for engaging the pipe and mounting the semicircular members coaxially therewith, and
  a pair of crown cams secured to the semicircular members coaxial with the pipe, said crown cams each comprising one half of a sinusoidal wave linearly of the pipe and one half of a circle transversely of the pipe, said cams being so constructed as to guide the reciprocal movement of the support rod as the carriage revolves about the pipe.

References Cited
UNITED STATES PATENTS

| | | | |
|---|---|---|---|
| 2,408,517 | 10/1946 | Howard | 33—21 |
| 2,509,698 | 5/1950 | Rudisell | 266—23 X |
| 3,063,697 | 11/1962 | Galezniak | 266—23 |
| 3,166,620 | 1/1965 | Galezniak | 266—23 |

J. SPENCER OVERHOLSER, Primary Examiner

R. D. BALDWIN, Assistant Examiner

U.S. Cl. X.R.

33—21; 228—4